W. C. Mason,
Making Knives, &c.
N° 79,371.  Patented June 30, 1868.
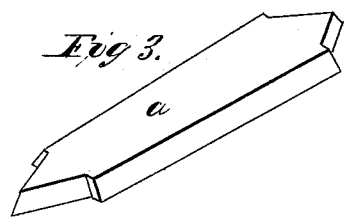
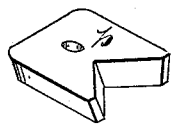
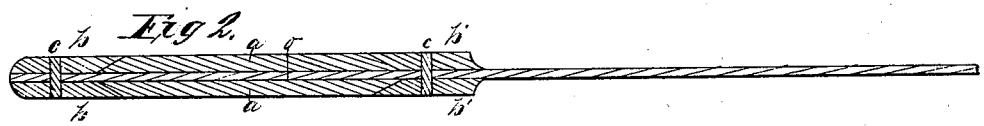
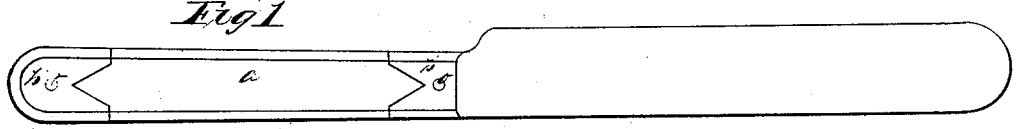
Witnesses:
W D Lewis
B Cushing
Inventor.
William C Mason
by Bakewell & Christy
his Attys

United States Patent Office.

WILLIAM CHARLES MASON, OF BEAVER FALLS, PENNSYLVANIA.

Letters Patent No. 79,371, dated June 30, 1868.

IMPROVEMENT IN CUTLERY.

The Schedule referred to in these Letters Patent and making part of the same.

TO ALL WHOM IT MAY CONCERN:

Be it known that I, WILLIAM CHARLES MASON, of Beaver Falls, in the county of Beaver, and State of Pennsylvania, have invented a new and useful Improvement in Pocket and Table-Cutlery; and I do hereby declare the following to be a full, clear, and exact description thereof.

My improvement consists in the attaching of the scale to the handle of table-knives, forks, case-knives, and other articles of cutlery, by means of the bolster-pieces, and without any rivets, pins, or other fastenings, through the scales.

The scale of the handle of articles of cutlery is usually made of ivory, shell, mother-of-pearl, or other similar material, and is fastened to the handle or tine by means of rivets, which pass through the scale, and require to be hammered, in order to hold the scale to its place. This operation is troublesome and expensive, and where the scale is a delicate or brittle material, it is apt to be cracked or broken. Sometimes the scale of knives will become loose, and sometimes it will crack near to the rivet, thus spoiling the appearance of the article. My improvement obviates all these difficulties, and makes a cheaper and more beautiful finish to cutlery.

To enable others skilled in the art to use my invention, I will proceed to describe the manner of its use.

In the accompanying drawing, forming part of this specification—

Figure 1 is a side view of the handle of the table-knife with my improvement.

Figure 2 is a view of the back of the handle of the same knife.

Figure 3 is a representation of the scale detached from the knife.

Figure 4 is a representation of the bolster detached from the knife.

Like letters represent the same parts whenever used in the several figures.

In the drawing, $a$ represents the tine of the knife; $b$ $b'$ are the bolsters, which are secured to the tine by means of rivets $c$ $c$, in the ordinary manner, as shown in fig. 2. The edges of these bolsters which adjoin the scale $d$ are bevelled, the widest surface of the bolsters being turned outside, so that the edges may overlap the corresponding edges of the scale $d$, which is similarly bevelled in the opposite direction, so as to fit closely between the bolster $b$ $b'$ at each end of the knife-handle.

The ends of the bolsters $b$ $b'$ next to the scale are not only bevelled, but are also indented, or otherwise so shaped as that the scale, fitting into the bolsters $b$ $b'$, is longer in the middle than at either edge.

By this means not only is the scale held down to the handle of the knife by the bevelled ends of the bolsters, but it is also prevented from slipping sideways by the indenting of the bolsters, and thus, the scale being made exactly to fit between the bolsters, and being put in place before the bolsters are riveted to the knife-handle, is as securely fastened in place as if it were riveted, without any pin or rivet being passed through or inserted in it.

Having thus described my improvement, what I claim as my invention, and desire to secure by Letters Patent, is—

Securing the scale to knives, forks, and other articles of cutlery, by bevelling and indenting the edges of the bolster-pieces, and fitting the edges of the scale into such bevels and indentations, the bolsters being attached to the handles by rivets in the ordinary manner, substantially as described.

In testimony whereof, I, the said WILLIAM CHARLES MASON, have hereunto set my hand.

WM. C. MASON.

Witnesses:
A. S. NICHOLSON,
W. BAKEWELL.